(12) United States Patent
Fukuwaka et al.

(10) Patent No.: US 6,692,393 B2
(45) Date of Patent: Feb. 17, 2004

(54) PULLEY BALL BEARING AND PULLEY

(75) Inventors: Masao Fukuwaka, Shioka-ken (JP); Seiya Inoue, Shioka-ken (JP); Takahiro Kanamoto, Shioka-ken (JP); Hiroshi Kawamura, Shioka-ken (JP)

(73) Assignee: NTN Corporation, Osaka-fu (JP)

( * ) Notice: Subject to any disclaimer, the term of this patent is extended or adjusted under 35 U.S.C. 154(b) by 0 days.

(21) Appl. No.: 10/014,788

(22) Filed: Dec. 14, 2001

(65) Prior Publication Data

US 2002/0086754 A1 Jul. 4, 2002

(30) Foreign Application Priority Data

Dec. 21, 2000 (JP) .......................................... 2000-389330

(51) Int. Cl.[7] .............................. F16H 7/20; F16H 7/12
(52) U.S. Cl. ........................................ 474/199; 474/135
(58) Field of Search .............................. 474/199, 166; 384/526, 523, 470, 527, 547, 543, 488; 29/898.067

(56) References Cited

U.S. PATENT DOCUMENTS

| 4,019,790 | A | * | 4/1977 | Earsley et al. ............... 384/526 |
| 4,602,875 | A | * | 7/1986 | Doerr et al. ................. 384/547 |
| 5,553,949 | A | * | 9/1996 | Fukuwaka et al. .......... 384/523 |
| 5,558,448 | A | * | 9/1996 | Yabe et al. .................. 384/470 |
| 5,728,020 | A | * | 3/1998 | Muranaka et al. ........... 474/199 |
| 6,102,822 | A | * | 8/2000 | Nakazeki .................... 474/199 |
| 6,315,456 | B1 | * | 11/2001 | Tanimoto et al. ........... 384/527 |

FOREIGN PATENT DOCUMENTS

| GB | 2058243 A | * | 4/1981 |
| JP | 10-19039 | * | 1/1998 |
| JP | 2000-186722 A | * | 7/2000 |

* cited by examiner

*Primary Examiner*—Marcus Charles
(74) *Attorney, Agent, or Firm*—Arent Fox Kintner Plotkin & Kahn, PLLC

(57) ABSTRACT

A ball bearing for a pulley that is a component of a wrapping connector transmission device installed to an engine for an automobile. In the bearing, the depths of ball grooves formed in the inner ring and the outer ring of the ball bearing are set so that the risk rate of the ball being stranded on the shoulder becomes approximately the same for the inner ring and the outer ring under pure thrust load. Furthermore, the depth of the ball groove of the outer ring is set shallower than the depth of the ball groove of the inner ring. The depth of the ball groove of the outer ring is set in a range of 12–19% of the diameter of the ball.

12 Claims, 6 Drawing Sheets

$T2 > T1$
$T2 - T1 = \Delta t$
$t2 - t1 \cong \Delta t$

PULLEY BALL BEARING AND PULLEY

BACKGROUND OF THE INVENTION

1. Field of the Invention

The present invention relates to a pulley ball bearing and a pulley, for instance, a pulley that is a component of a wrapping connector transmission device installed in an engine for an automobile.

2. Description of the Related Art

As it is well known, engines for automobiles are equipped with a wrapping connector transmission device for driving a component of the engine such as cam shaft as well as various auxiliary equipment such as an alternator, a water pump, an oil pump, and an air conditioner by utilizing the revolution of the engine output shaft. This wrapping connector transmission device is equipped with an idler pulley and a tension pulley as floating pulleys for increasing the contact angle of the wound belt or for adding the required tension to the belt as well as a pulley for driving auxiliary equipment to which the belt is wound.

In the case of this kind of floating pulley, the pulley circumferential surface that comes into contact with the belt must have an idling structure against the irrotational shafts such as the fixed shaft. As an example, forming the pulley circumferential surface directly on the outside diameter of the outer ring of ball bearings (bevel type outer ring) is known. On the other hand, a structure in which the pulley main body possessing pulley circumferential surface integrally inter-fitted with ball bearings, is widely used.

As shown in FIG. 6, ball bearings used in the latter pulley are equipped with an outer ring 30 fitted into the inner diameter portion of the pulley main body (not illustrated), an inner ring 31 fitted into an irrotational shaft, a plurality of balls 32 assembled between both ball grooves 30a and 31a of the outer ring 30 and the inner ring 31, a retainer 33 to retain the balls 32 at required intervals in the circumferential direction, and a pair of seals 34 for sealing grease filled between the outer ring 30 and the inner ring 31. In the case of this kind of pulley, it is composed so that the outer ring 30 revolves together with the pulley main body when the pulley main body receives the revolving drive from the belt and revolves.

As for the conventional structure of the ball bearings for such a pulley, the pitch circle diameter (PCD) of ball 32 normally lies roughly in the middle of the outside diameter of the outer ring 30 and the inside diameter of the inner ring 31. The ball groove depth (shoulder height) 30t of the outer ring 30 and the ball groove depth 31t of the inner ring 31 are set so that they fall within about 20% of the ball diameters.

In making such a setting, in a state of general usage including usage to other objects, disadvantages should not occur to the ball bearings. Concretely speaking, this is based on the fact that consideration is given so that extreme drop in rigidity caused by the formation of ball grooves 30a, 31a do not occur, or drop in bearing performance caused by radial load and thrust load do not occur.

On the other hand, since high load or offset load (moment load) hardly acts on this kind of pulley, load will not have great influence on the life of the ball bearings. However, in case where the grease deteriorates and its life is shortened, it results in shortening the life of the ball bearings. In other words, in cases such as the usage mode, during high speed revolution of the outer ring 30, if the addition of load is small, slippage occurs between the balls 32 and the inner and outer rings 30, 31, the grease temperature rises because of friction heat, causing early deterioration of grease, and as a result, there is concern that it may shorten the life of the ball bearings.

Such a problem can be solved by increasing the amount of grease that is filled between the outer ring 30 and the inner ring 31, but as mentioned above, if the amount of grease is merely increased under the setting conditions of each portion of the ball bearings, the sealing ratio of the amount of grease versus the space volume between the outer ring 30 and inner ring 31 becomes excessively larger than the optimum value, so it brings forth temperature rise of grease caused by agitation heat build-up and grease leakage. As a result, on the contrary, it becomes a factor for shortening the life of the grease.

In comparison with this, if the depth of the ball groove 30a of the outer ring 30 and the depth of the ball groove 31a of the inner ring 31 are made shallow, the space volume between both rings 30 and 31 can be made larger. However, if the depths of the ball grooves 30a and 31a of both rings 30 and 31 are merely made shallow, in case where thrust load (axial load) acts upon them, the so called shoulder stranded state where the ball 32 becomes stranded on the shoulders 31a1 and 30a1 of the inner ring 31 or outer ring 30 occurs, and roughness or separation occurs on the surface of the ball 32 or ball grooves 30a and 31a, and there is concern of the life of the ball bearings being shortened.

On the other hand, as for the retainer 33 of the ball bearings, the snap-on type made of synthetic resin is broadly used, and the cross section is designed so that the inner diameter side and the outer diameter side has identical dimensions versus the pitch circle diameter (PCD) of the ball 32.

However, if the revolution speed of the outer ring 30 becomes high, and for instance, the dn value (inside diameter d X number of revolutions n) becomes around 250,000, the retainer 33 is influenced by the centrifugal force, and expand as well as deform. As a result, the guide surface edge of the claws for the deformed retainer 33 comes into close contact with the ball 32, causing abnormal friction and heat build-up, or the retainer 33 is pushed out in the axial direction by the ball 32, and there is fear of causing interference with the seal 34. This may lead to concerns such as the shortening of the retainer life, and in turn, the shortening of the ball bearing life.

SUMMARY OF THE INVENTION

The present invention has been devised in view of the aforementioned circumstances, and it is a technical object of the present invention to prolong the life of pulley ball bearings, and in turn, the life of the pulleys by increasing the sealed amount of grease at the optimum ratio by sufficiently securing the space volume between inner and outer rings while effectively solving the problems of shoulder stranded balls, and at the same time by reducing the expansion and deformation caused by large centrifugal forces at the time the outer ring revolves at high speed as much as possible by increasing the rigidity of the retainer is heightened.

In order to achieve the above-mentioned technical object, in a ball bearing for a pulley that is inter-fitted to a pulley main body having pulley circumferential surface coming into contact with a belt, the present invention is characterized by setting ball groove depths formed in an inner ring and an outer ring of the ball bearings so that a risk rate of shoulder stranded balls is approximately equal between the inner ring and the outer ring under pure thrust load.

In other words, the present invention has been devised by paying our attention to the point that the risk rate of the shoulder stranded contact ellipse based on contact of the ball at the time pure thrust load (pure axial load) acts, varies between the inner ring and the outer ring, in case where the depths of ball grooves of the inner ring and the outer ring are both made the same as in the conventional ones. In other words, this is based on paying attention to the point that in case where the depths of the ball grooves for the inner ring and the outer ring are made equal to each other, the permissible thrust load of the inner ring side that becomes the judgment standard of whether the ball becomes stranded on the shoulder of the inner ring or not, and the permissible thrust load of the outer ring side that becomes the judgment standard of whether the ball becomes stranded on the shoulder of the outer ring or not, are different.

The reason why the risk rate of the ball becoming stranded on the shoulder varies between the inner ring and the outer ring, is that the radius of curvature for the ball groove of the inner ring is smaller than the radius of curvature for the ball groove of the outer ring, and that the ball groove of the inner ring is convex with respect to the circumferential direction whereas the ball groove of the outer ring is concave with respect to the circumferential direction. In case where the depths of the ball grooves are the same for the inner ring and the outer ring, the risk rate of the ball being stranded on the shoulder is greater for the inner ring than for the outer ring. In other words, it is evident that the permissible thrust load of the inner ring is smaller than that of the outer ring. (Details will be mentioned later on.)

Therefore, in the above-mentioned constitution, in order to set the ball groove depths so that the risk rate of the ball being stranded on the shoulder becomes approximately the same between the inner ring and the outer ring under the condition of pure thrust load, the depth of the ball groove for the outer ring shall be made shallower than the depth of the ball groove for the inner ring by a dimension corresponding to the difference in risk rate of ball being stranded on the shoulder of the two rings, that is, a dimension corresponding to the difference in the permissible thrust load between the two.

If composed in the above manner, by the dimension made shallower for the ball groove of the outer ring, the space volume between the outer ring and the inner ring becomes large, it is possible to make the amount of grease to be filled increased and as a result, the life of the grease, and in turn, the life of the ball bearings can be extended. Furthermore, since the ball being stranded on the shoulder occurs under approximately the same thrust load conditions between the outer ring and the inner ring, it becomes possible to cope with the problem of the ball being stranded on the shoulder effectively without any waste.

It is desirable to set the dimension between the inside diameter and the outside diameter of the outer ring (thickness of the outer ring) to be shorter by the dimension corresponding to approximately the difference in the depth of the ball groove between the outer ring and the inner ring than the dimension between the inside diameter and outside diameter of the inner ring (thickness of the inner ring). If it is composed in this manner, , the thickness of the outer ring can be made thinner and light-weight, while making the depth of the ball groove for the outer ring shallower. In addition, in spite of the thickness for the outer ring becoming thinner, since the ball groove also becomes shallower accordingly, the thickness in the vicinity of the deepest portion of the ball groove for the outer ring does not become thin, and the rigidity of the outer ring is maintained sufficiently.

It is desirable to set the depth of the ball groove for the outer ring within a range of about 12–19% of the ball diameter. This setting condition is determined by taking into consideration the fact that if the depth of the ball groove for the outer ring is less than 12% of the ball diameter, the ball being stranded on the shoulder appears significantly, and if the depth of the ball groove for the outer ring is greater than 19% of the ball diameter, sufficient space volume cannot be secured for grease filling. Thus, in the case of such a setting, sufficient space volume can be secured between the inner and outer rings while coping with the problem of the ball being stranded on the shoulder of the outer ring without any waste, and it becomes possible to suitably increase the amount of grease to be filled.

A retainer which is installed between the outer ring and the inner ring and which holds the balls so that they can roll freely may be preferably formed as a snap-on type made of synthetic resin. In addition, it is preferable that the outside diameter thereof is formed with a larger dimension than the inside diameter thereof with respect to the pitch circle diameter of the ball. In other words, as mentioned above, under a setting condition in which the depth of the ball groove for the outer ring is shallower than the depth of the ball groove for the inner ring, the space volume between the outer ring and the inner ring becomes larger for the outside diameter side (outer ring side) than the inside diameter side (inner ring side) with respect to the pitch circle diameter of the ball. Therefore, in accordance with this, if the retainer is formed so that the outside diameter side becomes larger than the inside diameter side with respect to the pitch circle diameter, the thickness in the radial direction of the retainer can be made thicker until both clearances that exist between the inner and outer rings become almost equal, and the rigidity of the retainer can be heightened as much as possible. As a result, at the time of high speed revolution of the outer ring, the situation in which the retainer is expanded and deformed by the effect of centrifugal force can be suppressed as much as possible. Consequently, abnormal friction and heat build-up at the contact surface between the balls and the retainer as well as interference with the seals caused by the balls being pushed out from the retainer can be avoided.

It is desirable to fill the grease within the range of 27.5%–32.5% with respect to the space volume that exists inside of the ball bearings. If it is composed in this manner, it is possible to fill the grease into the space volume that is increased by making the ball groove of the outer ring shallow at the optimum rate of 27.5%–32.5%, preferably at 30%, determined by experiments conducted beforehand. As a result, it is possible to increase the amount of grease to be filled without occurring agitation heat build-up or grease leakage due to excessive rate of grease filled amount with respect to the space volume. This leads to long life of the grease, and in turn, long life of the ball bearings for the pulleys can be aimed.

As base oil of the grease, it is preferable to use ester type synthetic oil. By doing so, grease that has long life against high temperature and excellent low temperature characteristics can be obtained, and long life of the grease, and in turn, the long life of the ball bearings for the pulley can be aimed at all the more.

It is desirable for the pulley ball bearings having the above-mentioned constitution to be used as pulley bearings that is a component of a wrapping connector transmission device that is driven by an engine for an automobile. It is suitable for pulleys in such a case to be floating pulleys such as idler pulleys used for increasing the contact angle of the wound belt, and tension pulley used for adding the required tension to the belt. In this case, the term "pulley" means not only timing pulley and V pulley but also a concept that includes sprockets. Furthermore, the term "belt" means a concept that includes not only timing belts and V-belts but also chain. According to the resulted constitution, it is possible to correspond suitably to high revolution of the engine for an automobile, and in turn, the high revolution request of the outer ring for bearings.

The nature, principle, and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 5(a) shows a plan view of the main portion thereof, FIG. 5(b) shows a cross sectional view taken along a line V(b)–V(b) in FIG. 5(a), and FIG. 5(c) shows a cross sectional view taken along a line V(c)—V(c) in FIG. 5(a)

DETAILED DESCRIPTION OF THE PREFERRED EMBODIMENTS

Embodiments of the present invention will be described below according to the drawings.

Figure 1:
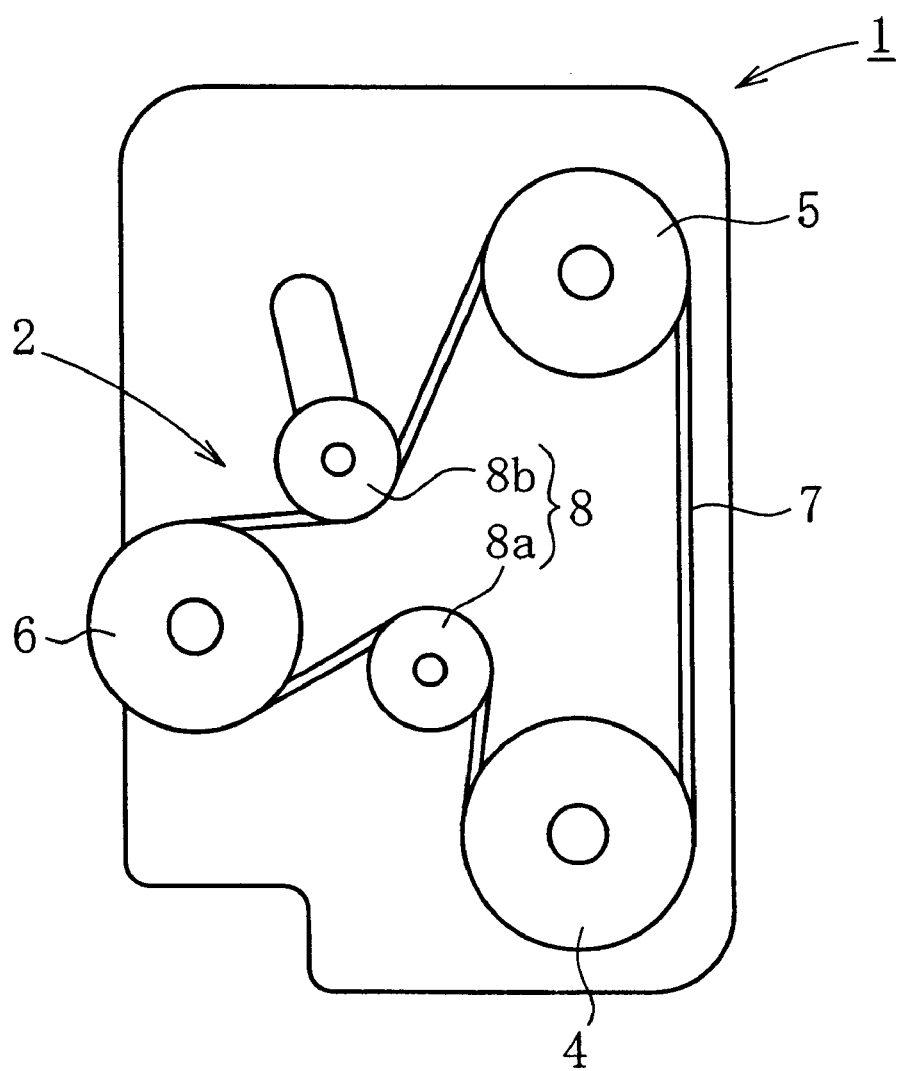
FIG. 1 is a schematic front view showing a wrapping connector transmission device of an engine for an automobile in which pulleys according to the present invention are used.

FIG. 1 shows an example of a wrapping connector transmission device to which a pulley and a ball bearing for a pulley according to an embodiment of the present invention. As shown in the same drawing, the wrapping connector transmission device 2 installed to one side portion of an engine 1 for an automobile is equipped with a drive pulley 4 fixed to an engine output shaft, and a first driven pulley 5 fixed to, for example, a drive shaft of a cam shaft, and a second driven pulley 6 fixed to, for example, a drive shaft of a water pump. A belt 7 is wound around the respective pulleys 4, 5, and 6.

Between the drive pulley 4 and the second driven pulley 6, an idler pulley 8a that increases the contact angle of the belt to the both pulleys 4 and 6 is supported to rotate freely on the fixed shaft. In addition, between the first driven pulley 5 and the second driven pulley 6, a tension pulley 8b that provides a required tension to the belt 7 is supported by an irrotational movable shaft so that it can rotate freely. The pulley and ball bearing for a pulley according to the present invention are applied to the idler pulley 8a and the tension pulley 8b (hereinafter referred to as floating pulleys 8, their general term) in this embodiment.

Figure 2:
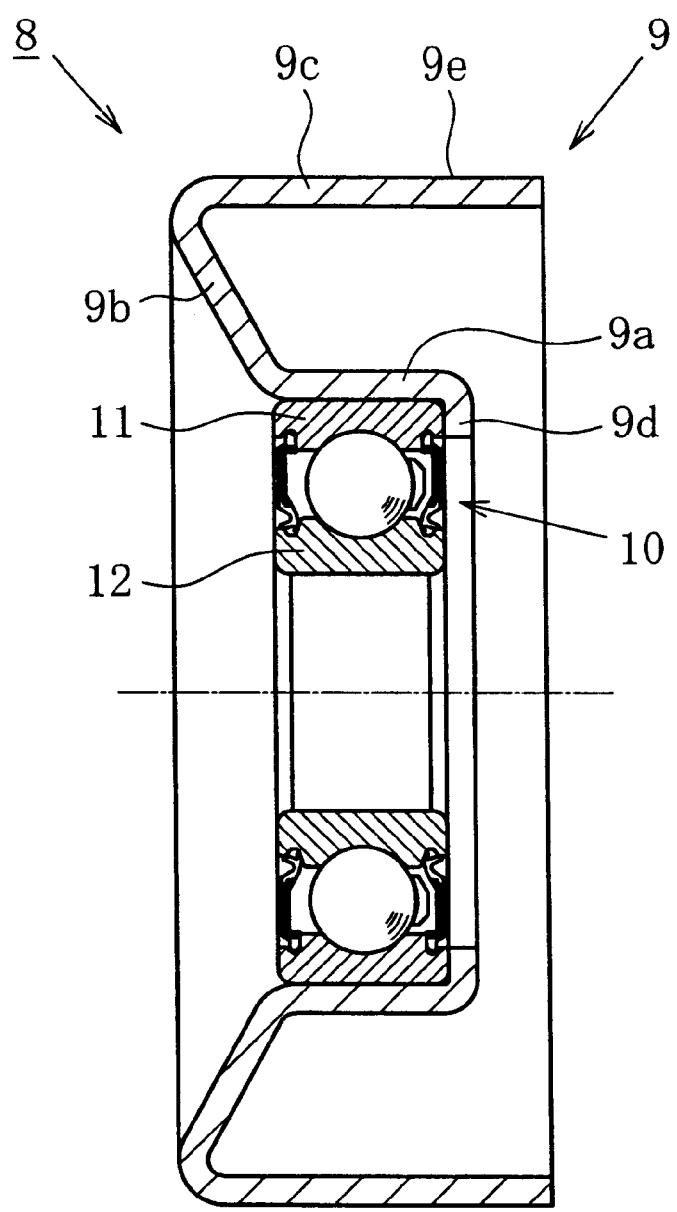
FIG. 2 is a side view of longitudinal section showing the pulley according to the present invention.

As shown in FIG. 2, the floating pulley 8 comprises a pulley main body 9 made of pressed steel plate and a single row of deep grooved ball bearing 10 fitted into the inside diameter portion of the pulley main body 9. The pulley main body 9 is an annular body equipped with an inside diameter cylinder portion 9a and an outside diameter cylinder portion 9c that are parallel to each other, a flange portion 9b having an partial conical shape connecting the tip ends of both cylinder portions 9a and 9c, and a collar portion 9d extending from the edge of the inside diameter cylinder portion 9a to the inside diameter side.

To the inside diameter portion of the inside cylinder portion 9a, an outer ring 11 of the ball bearing 10 is fitted, and to the outside diameter portion of the outside diameter cylinder portion 9c, a pulley circumferential surface 9e that comes into contact with the back side of the belt 7 is formed. Furthermore, it is composed so that in a state in which the pulley circumferential surface 9e is in contact with the back side of the belt 7 (Refer to FIG. 1), by driving the drive belt 7 with the engine output shaft, the floating pulley 8 revolves as idler pulley 8a and tension pulley 8b.

Figure 3:
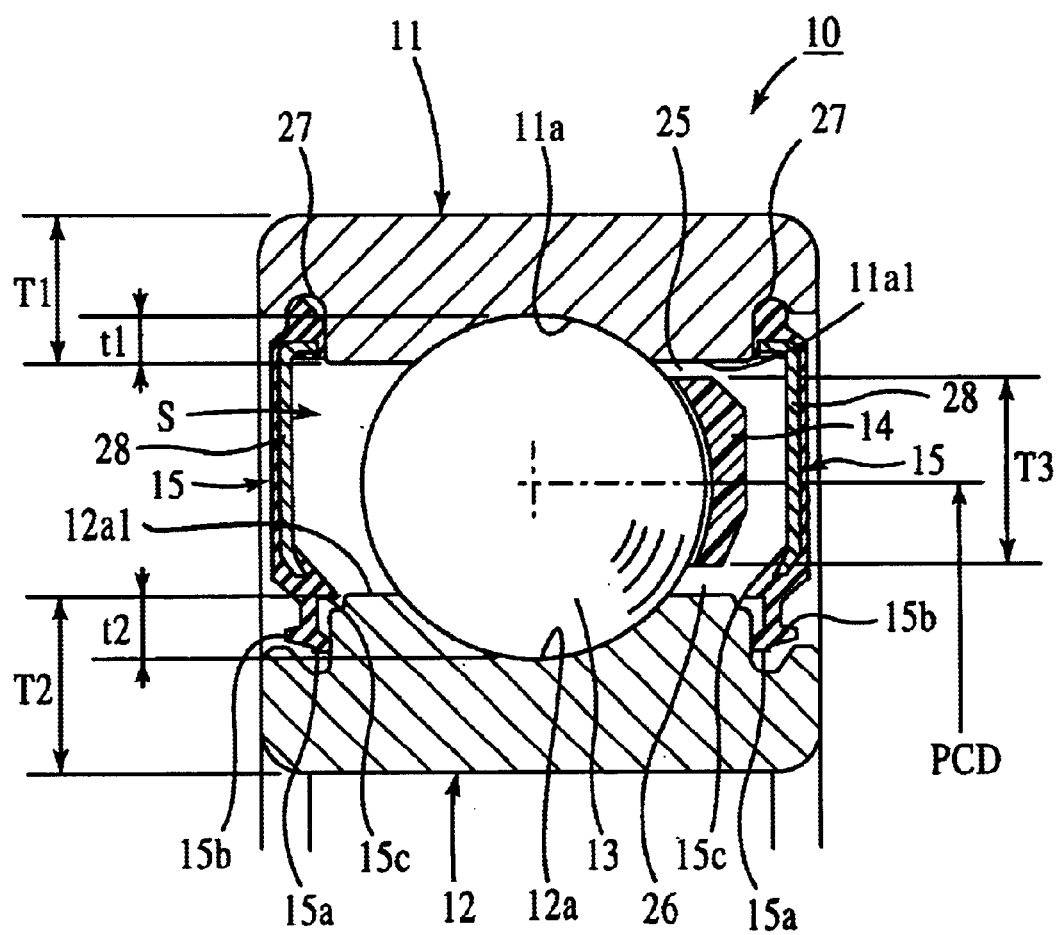
FIG. 3 is a side view of longitudinal section of enlarged main portion showing a ball bearing for a pulley according to the present invention.

As shown in the enlarged drawing of FIG. 3, the ball bearings 10 comprise the above-mentioned outer ring 11, an inner ring 12 inter-fitted to the fixed shaft that is not illustrated or to the irrotational movable shaft, a plurality of balls 13 arranged between both ball grooves 11a, 12a of the outer ring 11 and inner ring 12, a retainer 14 to hold the balls 13 at an equal interval in the circumferential direction, and a pair of seals 15 to seal grease.

The depth of both ball grooves 11a, 12a of the outer ring 11 and inner ring 12 are set so that under pure thrust load, the risk rate of the ball 13 being stranded on the shoulder is approximately the same between the outer ring 11 and inner ring 12. In more detail, by the dimension corresponding to the difference in the risk rate of the ball being stranded on the shoulder of outer ring 11 and that on the shoulder of the inner ring 12, in other words, by the dimension corresponding to the difference of permissible thrust load between the outer ring 11 and the inner ring 12, the depth t1 of the ball groove 11a of the outer ring 11 is made shallower than the depth t2 of the ball groove 12a of the inner ring 12.

Figure 4:
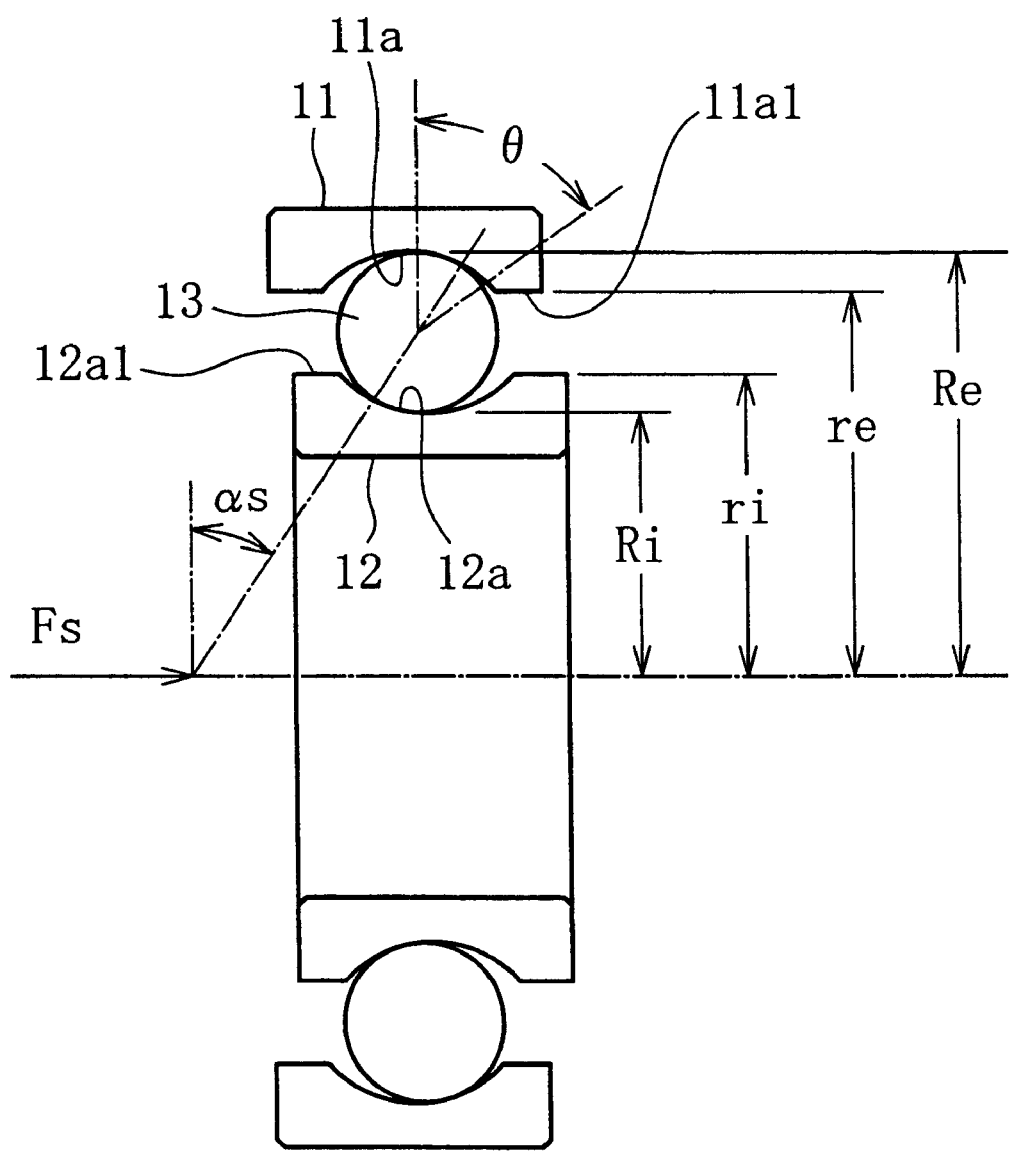
FIG. 4 is a schematic side view for describing the action effect of the ball bearing for a pulley according to the present invention.

The reason for conducting such a setting is as follows. In other words, as shown in the outer ring 11 of FIG. 4, by the action of thrust load Fs, the time at which one end of the elliptical contact surface between the ball 13 and ball groove 11a reaches the shoulder 11a1 of the ball groove 11a is made the boundary of whether or not the so called ball becoming stranded on the shoulder occurs, that is, whether the ball 13 becomes stranded on the shoulder of 11a1 or not, and the thrust load corresponding to this boundary is made the permissible thrust load. Furthermore, in the same drawing, if the angle at which the straight line connecting the center of ball 13 and one end of the ball groove 11a intersects with the radial direction plane is represented by θ, the deepest radii of ball grooves 11a, 12a of the outer ring 11 and inner ring 12 are represented by Re, Ri, respectively, and the radii of the shoulders 11a1, 12a1 of the outer ring 11 and inner ring 12 are represented by re, ri, respectively, and the contact angle (an angle at which a straight line connecting the center of ball 13 and the center of elliptical contact surface intersects with the radial direction plane) is represented by αs.

As an example, the permissible thrust load is calculated for deep groove ball bearings 6206 (bearing number) in case where the inside dimensions are (1)–(7) shown below.

(1) Re: 27.77 mm, Ri: 18.23 mm
(2) re: 25.92 mm, ri: 20.05 mm
(3) Diameter of ball 13: 9.525 mm
(4) Number of balls 13: 9
(5) Initial contact angle: 11.76
(6) Curvature ratio of ball groove 11a for outer ring 11: 0.52
(7) Curvature ratio of ball groove 12a for inner ring 12: 0.515

Based on the above figures, if calculations are made in accordance with the well-known arithmetic procedures, for the outer ring 11, θ–51.2°, αs ≦28.5 are obtained, and from these values of θ, αs the permissible thrust load Fse=10.7 KN can be obtained for the outer ring 11. Furthermore, in the case of the inner ring 12, θ=51.0°, αs ≦26.7 are obtained, and from these values of θ, αs 10 the permissible thrust load Fsi=7.79 KN can be obtained for the inner ring 12. The reason why the two permissible thrust loads Fse, Fsi vary, is mainly due to the above-mentioned Re, Ri values and re, ri values being different as well as the curvature ratios of both ball grooves 11a and 12a being different.

As it is obvious from these calculation results, the outer ring 11 side has larger permissible thrust load than the inner ring 12 side. In other words, the risk rate of the ball being stranded on the shoulder is lower for the outer ring 11 than the inner ring 12, and corresponding to the difference (or ratio) between the two permissible thrust loads Fse, Fsi, the depths t1, t2 of the ball grooves 11a, 12a of the inner and outer rings 11, 12 are set. By doing so, the ball being stranded on the shoulders of the outer ring 11 and the inner ring 12 will occur at approximately the same thrust load conditions. Thus, there is no need of making the ball groove 11a of the outer ring 11 unnecessarily deep. As a result, it is possible to conduct an effective design as ball bearings for pulleys.

In addition, by referring to FIG. 3, the dimension T1 between the inside and outside diameters of the outer ring 11 is set shorter than the dimension T2 between the inside and outside diameters of the inner ring 12, by the dimension corresponding to Δt, the difference in the depths t1, t2 in both ball grooves 11a, 12a of the outer ring 11 and the inner ring 12. In other words, the relation of the relative positions between the outside diameter dimension of the outer ring 11 and its outside diameter plane versus the ball groove 11a is approximately the same as the aforementioned conventional example shown in FIG. 6, and only the inside diameter of the outer ring 11 (diameter of shoulder 11a1) becomes a larger diameter. Thus, in spite of making the depth t1 of the ball groove 11a for the outer ring 11 shallow, the thickness T1 of the outer ring 11 becomes thin and light-weight, and in spite of the thickness T1 of the outer ring 11 being thin, it secures sufficient thickness in the vicinity of the deepest portion of the ball groove 11a.

In this case, the depth t1 of the ball groove 11a for the outer ring 11 is set within a range of 12–19% of the diameter of the ball 13. This means that the depth t1 of the ball groove 11a for the outer ring 11 is made shallow in comparison with conventional single row deep groove ball bearings. If a concrete example is given, in the case of deep groove ball bearings 6203 (bearing number), hitherto, the above figure was set at 19.2% for both the inner and outer rings. Contrary to this, in the case of the present embodiment, only the outer ring 11 is set to, for instance, 13.6%. If such a setting is made, the internal space volume S between the outer ring 11 and the inner ring 12 increases by 3–8% in comparison with the conventional way. Furthermore, as other concrete examples, in the case of deep groove ball bearings 6303 (bearing number), hitherto both the inner ring and the outer ring were set at 20.2%, but in this embodiment the outer ring 11 was set to 15.6%, and further, in the case of deep groove ball bearings 6304 (bearing number), hitherto both the inner ring and the outer ring were set to 20.1%, but in this embodiment the outer ring 11 is set to 15.4%. In either of these cases, the internal space volume S between the outer ring 11 and the inner ring 12 increased by 3–8% in comparison with the conventional way.

In case where the above matter is took into consideration, if the depth t1 of the ball groove 11a of the outer ring 11 is greater than 19% of the diameter of the ball 13, since sufficient internal space volume S cannot be secured, there is fear of shortening the life of the ball bearings 10 due to an insufficient amount of the filled grease. On the other hand, if it is less than 12% of the ball diameter, since the ball groove 11a becomes too shallow, the problem of the ball being stranded on the shoulder becomes significant. Therefore, by setting the above-mentioned ratio in the range of 12%–19%, the problems of the amount of filled grease and the ball being stranded on the shoulder can be solved simultaneously.

Figure 5A:
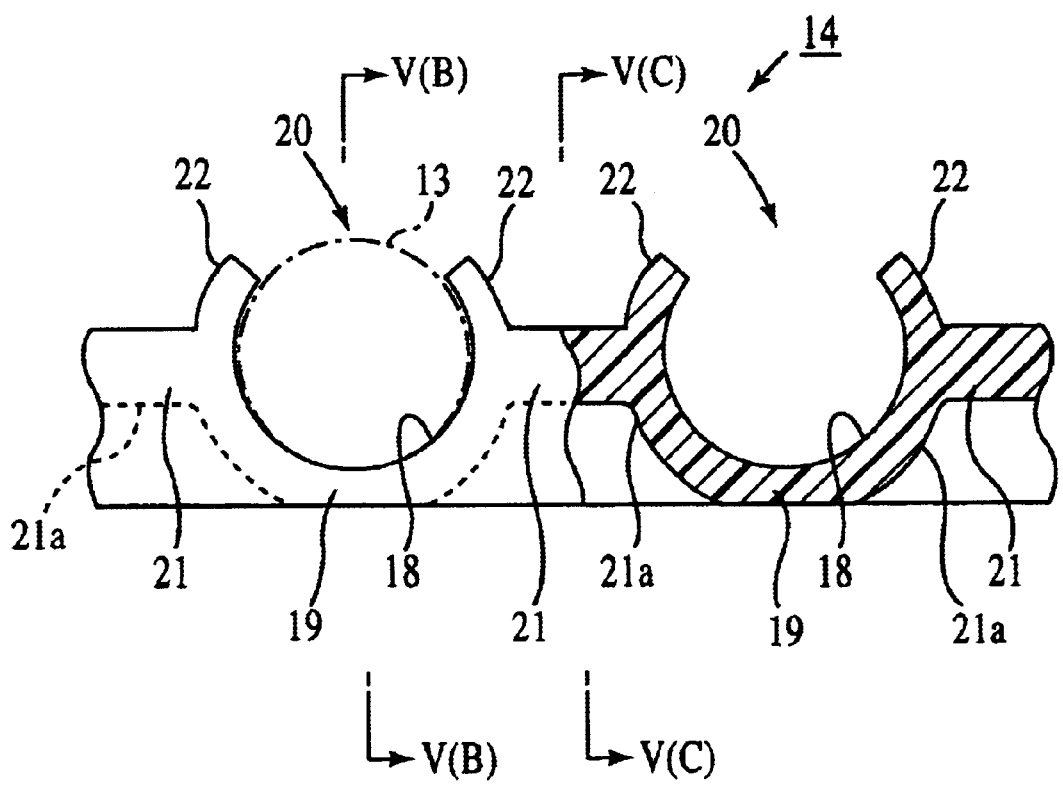
FIGS. 5(a) to 5(c) show a retainer of the ball bearing for a pulley according to the present invention.
Figure 5B:
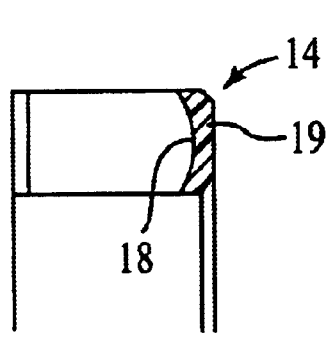
Figure 5C:
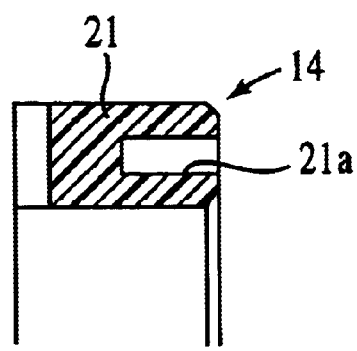

As shown in FIG. 5, the retainer 14 is a crown type retainer of the so-called snap-on type formed by injection molding, for instance, synthetic resin. It is equipped with a plurality of pockets 18 arranged at an equal interval in the circumferential direction, and one side in the axial direction of these pockets 18 is made as an annular base portion 19, and also, the other side in the axial direction is made as an opening portion 20. The circumferential surface of the pockets 18 is formed into a concave spherical surface, and at the same time, the diameter of the pocket 18 is set at a typical value for this type of retainer. For instance, a pocket gap of about 0.2–0.3 mm is added to the diameter of the ball 13 when setting.

Between the respective pockets 18, connection is made with an annular column portion 21 integrally formed with the annular base portion 19. The above mentioned opening portion 20 is formed between a pair of claws 22 made to extend in arc shape from the annular column portion 21 to the other side in the axial direction. Each opening portion 20 is set at a dimension smaller than the diameter of the ball 13, and each claw 22 is formed thin so that elastic deformation becomes possible. In addition, in the annular column portion 21, a concave recess portion 21a is formed by evading the outer circumferential portion and the center portion in the axial direction of each pocket 18. At the time of mounting the retainer 14, the tips of the pair of claws 22 are pressed to the ball 13 installed between the ball grooves 11a and 12a of the outer ring 11 and the inner ring 12, and the opening portion 20 is elastically widen by pressing against the ball 13 to accommodate the ball in the pocket 18 (snap-on type). After accommodating the ball 13, by the elastic restoration of the pair of claws 22, the falling off of the retainer 14 is prevented.

The retainer 14 (refer to FIG. 3) is formed so that the outside diameter side is made to be longer than the inside diameter side with respect to the pitch circle diameter (PCD) of the ball 13. In this case, both clearances 25, 26 that exist between the outside diameter plane of the retainer 14 and the inside diameter plane of the outer ring 11, and between the inside diameter plane of the retainer 14 and the outside diameter plane of the inner ring 12, respectively, are set so that they have almost the same size. Thus, the dimension between the inside and outside diameter (thickness) T3 of the retainer 14 becomes longer in comparison with the conventional one by the amount the inside diameter of the outer ring is extended, and the rigidity of the retainer 14 is increased as much as possible. By doing so, even in case where the outer ring 11 revolves at high speed, expansion and deformation of the retainer 14 caused by the centrifugal force will not occur easily. Therefore, occurrence of abnormal friction and high heat build-up at the contact surface of the ridge of the guide surface of the claw 22 and the ball 13 or interference with the seal 15 caused by the retainer 14 pushed out by the ball 13 in the axial direction can be avoided as much as possible.

Figure 6:
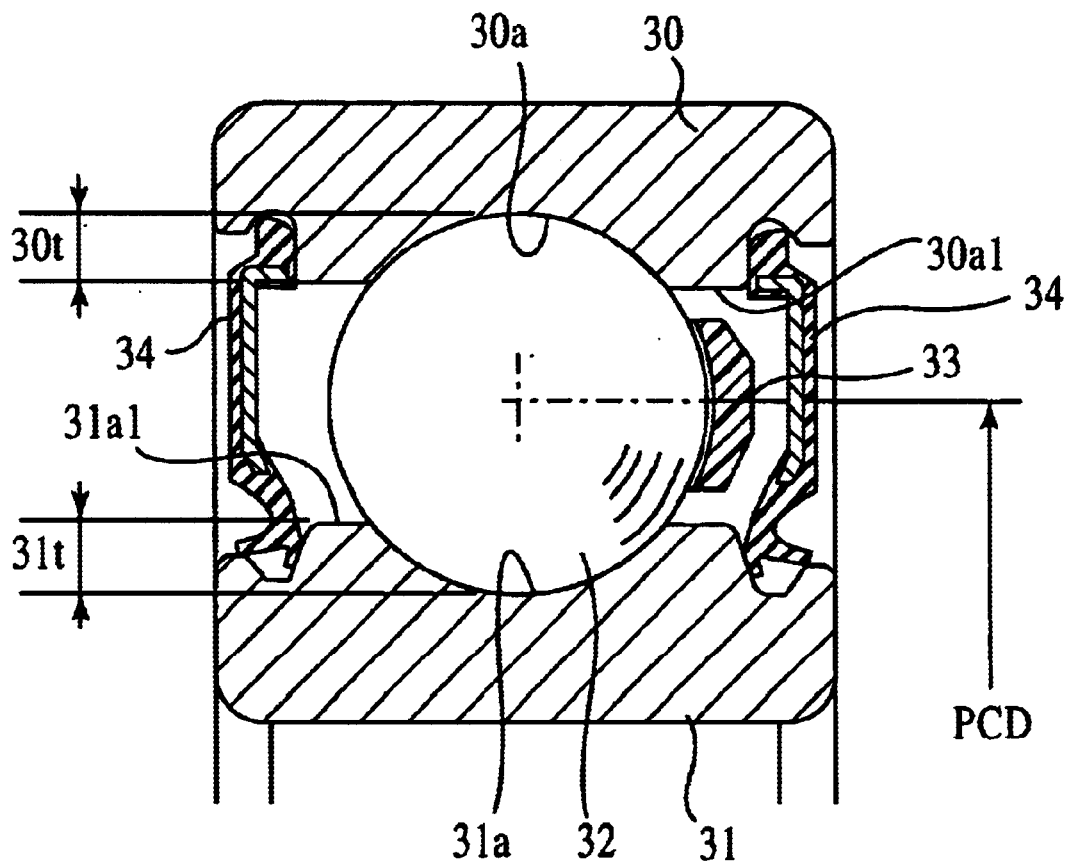
FIG. 6 is a side view of longitudinal section of an enlarged main portion showing a ball bearing for a conventional pulley.

In this case, with respect to deep groove bearings 6203 (bearing number), tests were conducted under the conditions shown in the following (1)–(4) on pulleys installed with bearings having improvements shown in FIG. 3 (improved bearings), and pulleys installed with bearings that are not improved (conventional bearings shown in FIG. 6). Subsequently, evaluation of whether wear exists or not in the retainers of both bearings was made.

Pulley Load: 670N
Temperature: 100–110° C.
RPM of Outer Ring: 15600 r/min
Operating Time: 168 h As a result of this test, it was concluded that in the inner circumferential surface of the retainer pocket (in particular, inner circumferential surface of the claws) of the conventional bearings, slight or obvious wear or wear traces were seen, and contrary to this, in the case of the inner circumferential surface of the inner circumferential surface of the retainer pocket of the improved bearings, wear or wear traces could hardly be seen or not seen at all. According to this conclusion, in the case of the retainers with improved bearings, it can be surmised that expansion and deformation caused by centrifugal force do not occur.

On the other hand, with respect to the space volume S that exists inside of the ball bearings 10, grease is sealed in the range of 27.5–32.5%. In other words, into the space volume S increased by making the ball groove 11a of the outer ring 11 shallow, that is, by making the inside diameter of the outer ring 11 large, grease is filled at the above-mentioned optimum ratio of the grease, more preferably at 30%. Thus, the amount of grease to be filled can be increased while maintaining the optimum grease ratio, and various non-conformities caused when the grease filling ratio is unsuitable, can be avoided, and extension of the grease life can be aimed at. By the way, if the above-mentioned ratio is less than 27.5%, a suitable lubrication performance cannot be obtained, and if the ratio is above 32.5%, agitation heat build-up and grease leakage will occur. In either case, it results in shortening the life of the ball bearings 10.

As the base oil of the above-mentioned grease, ester type synthetic oil, for example, a mixture of PAO (α-olefin oligomer) and ester is used. By using such grease, stability of oil film at low temperature and durability at high temperature can be secured.

The seal 15 is installed to groove 27 formed on the inner circumferential surface of the outer ring, and in order to maintain a stable sealing function even when receiving the influence of centrifugal force, the type of seal is made into axial contact type (inner ring contact type). The seal 15 is equipped with a main lip 15a located at the inside portion of the bearing 10, sub-lips 15b, 15c located at the outside portion and the inside portion of the bearing 10. The main lip 15a comes into contact with the seal surface of the inner ring 12 from the shaft direction, and forms a labyrinth seal between the sub-lip 15b, 15c and the inner ring 12. The seal material uses the standard ACM (polyacrylic rubber) as the base, and additives are compounded thereinto. It possesses heat resistance up to around 150° C. and in the interior, a core metal 28 is integrally fixed therein by insert molding. In addition, in case where a radial contact type seal is used, at the time the lip undergoes elastic deformation by the action of centrifugal force, the interference against the seal surface changes, and stable seal function cannot be obtained. However, in case of the aforementioned axial contact type seal 15, such a non-conformity will not occur.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A ball bearing for a pulley, the bearing being fitted into a pulley main body having a pulley circumferential surface coming into contact with a belt,
   the ball bearing for a pulley characterized by making a depth of a ball groove in an outer ring of said ball bearing shallower than a depth of a ball groove in an inner ring of said ball bearing and setting the depth of the ball groove in said outer ring of said ball bearing in a range of 12% to 19% of a ball diameter.

2. The ball bearing for a pulley according to claim 1, wherein a dimension between inside and outside diameters of said outer ring is set shorter than a dimension between inside and outside diameters of said inner ring by a dimension substantially corresponding to a difference in the depth of the ball groove between said outer ring and inner ring.

3. The ball bearing for a pulley according to claim 1, wherein a retainer accommodated between said outer ring and inner ring, for holding the balls so that they can revolve freely, is formed as a snap-on retainer made of synthetic resin, and an outside diameter side dimension thereof is formed larger than an inside diameter side dimension with respect to a pitch circle diameter of the ball.

4. The ball bearing for a pulley according to claim 1, wherein a grease is filled in a range of 27.5–32.5% with respect with a space volume existing inside of said ball bearing.

5. The ball bearing for a pulley according to claim 4, wherein a base oil of said grease is a synthetic oil containing ester.

6. The ball bearing for a pulley according to claim 1, wherein said belt is a belt for a wrapping connector transmission device driven by an engine for an automobile.

7. A ball bearing for a pulley, the bearing being fitted into a pulley main body having a pulley circumferential surface coming into contact with a belt,
   the ball bearing for a pulley characterized by setting a depth of a ball groove in an inner ring and a depth of a ball groove in an outer ring of said ball bearing so that a ball being stranded on a shoulder due to only thrust load occurs under approximately the same thrust load for said inner ring and outer ring according to claim 1,
   wherein a dimension between inside and outside diameter of said outer ring is set shorter than a dimension between inside and outside diameters of said inner ring by a dimension substantially corresponding to a difference in the depth of the ball groove between said outer ring and inner ring.

8. The ball bearing for a pulley according to claim 7, wherein a retainer accommodated between said outer ring and inner ring, for holding the balls so that they can revolve freely, is formed as a snap-on retainer made of synthetic resin, and an outside diameter side dimension thereof is formed larger than an inside diameter side dimension with respect to a pitch circle diameter of the ball.

9. The ball bearing for a pulley according to claim 7, wherein said belt is a belt for a wrapping connector transmission device driven by an engine for an automobile.

10. The ball bearing for a pulley according to claim 7, wherein a grease is filled in a range of 27.5 –32.5% with respect with a space volume existing inside of said ball bearing.

11. The ball bearing for a pulley according to claim 10, wherein a base oil of said grease is a synthetic oil containing ester.

12. A pulley in which the ball bearing for a pulley according to any one of claims 1 to 6 is fitted into the pulley main body having a pulley circumferential surface coming into contact with a belt.

* * * * *